(12) United States Patent
Suda

(10) Patent No.: US 8,667,913 B2
(45) Date of Patent: Mar. 11, 2014

(54) METHOD AND DEVICE FOR CONTROLLING RETENTION TIME OF FLUID MEDIUM IN FLUIDIZED-BED GASIFICATION FURNACE IN GASIFICATION FACILITY

(75) Inventor: Toshiyuki Suda, Tokyo (JP)

(73) Assignee: IHI Corporation, Tokyo (JP)

(*) Notice: Subject to any disclaimer, the term of this patent is extended or adjusted under 35 U.S.C. 154(b) by 600 days.

(21) Appl. No.: 13/002,575

(22) PCT Filed: Jul. 10, 2009

(86) PCT No.: PCT/JP2009/003225
§ 371 (c)(1),
(2), (4) Date: Jan. 4, 2011

(87) PCT Pub. No.: WO2010/004758
PCT Pub. Date: Jan. 14, 2010

(65) Prior Publication Data
US 2011/0107945 A1    May 12, 2011

(30) Foreign Application Priority Data
Jul. 11, 2008    (JP) .................................. 2008-181952

(51) Int. Cl.
*F23G 5/30*    (2006.01)

(52) U.S. Cl.
USPC ........................................ 110/245; 110/342

(58) Field of Classification Search
CPC .......... F27B 15/00; F27B 15/02; F27B 15/08; F27B 15/10; F27B 15/18; F23C 10/005; F23C 10/02; F23C 10/04; F23C 10/06; F23C 10/08; F23C 10/10; F23C 10/22; F23C 10/26; F23C 10/28; F23C 10/30; F23C 10/32; F23C 2206/102
USPC .................................................. 110/245, 342

See application file for complete search history.

(56) References Cited

FOREIGN PATENT DOCUMENTS

| JP | 63-120825 | 5/1988 |
| JP | 2002-98308 | 4/2002 |
| JP | 2003-148707 | 5/2003 |
| JP | 2005-41959 | 2/2005 |
| JP | 2007-112872 | 5/2007 |

OTHER PUBLICATIONS

U.S. Appl. No. 13/002,673, filed Jan. 5, 2011, Suda.
U.S. Appl. No. 13/003,413, filed Jan. 11, 2011, Takafuji, et al.

*Primary Examiner* — Kenneth Rinehart
*Assistant Examiner* — David J Laux
(74) *Attorney, Agent, or Firm* — Oblon, Spivak, McClelland, Maier & Neustadt, L.L.P.

(57) ABSTRACT

A method and device for controlling retention time of a fluid medium in a fluidized-bed gasification furnace in a gasification facility are provided. A fluid medium is guided to any of a plurality of fluid-medium charge ports connected to a gasification furnace at intervals from an upstream end thereof toward a downstream side in a distribution direction of a fluid medium longitudinally of the gasification furnace. A raw material is guided to any of a plurality of raw-material charge ports connected to the gasification furnace at positions longitudinally of the gasification furnace and correspondingly to the fluid-medium charge ports. The fluid medium is extracted and guided to a combustion furnace from a fluid-medium extraction port connected to a downstream end of the gasification furnace longitudinally thereof in the distribution direction of the fluid medium. Thus, retention time of the fluid medium in the gasification furnace is controlled.

5 Claims, 4 Drawing Sheets

FLUIDIZING GAS

METHOD AND DEVICE FOR CONTROLLING RETENTION TIME OF FLUID MEDIUM IN FLUIDIZED-BED GASIFICATION FURNACE IN GASIFICATION FACILITY

TECHNICAL FIELD

The present invention relates to a method and a device for controlling retention time of a fluid medium in a fluidized-bed gasification furnace in a gasification facility.

BACKGROUND ART

A gasification facility has been hitherto developed which produces a gasification gas by use of a raw material such as coal, biomass or tire chips as fuel.

FIG. 1 shows an example of a gasification facility under development. The gasification facility comprises a gasification furnace 2 having a fluidized bed 1 of a fluid medium (silica sand, limestone or the like) formed with steam to gasify a charged raw material (coal, biomass, tire chips or the like) for production of a gasification gas and a combustible solid, a combustion furnace 5 into which the combustible solid produced by the gasification furnace 2 is introduced through an introduction pipe 3 along with the fluid medium to form a fluidized bed 4 with a fluidizing gas such as air or oxygen to burn the combustible solid, a fluid-medium separator 8 such as a hot cyclone which separates a fluid medium from a combustion exhaust gas introduced from the combustion furnace 5 via an exhaust gas pipe 6 to supply the separated fluid medium via a downcomer 7 to the gasification furnace 2, a fluid-medium separator 9 such as a hot cyclone which separates a fluid medium from the gasification gas produced in the gasification furnace 2, and a recovery vessel 10 which recovers the fluid medium separated by the separator 9.

In FIG. 1, reference numeral 11 denotes a distributing plate for uniform blowing of the steam introduced through a bottom of the gasification furnace 2 into the fluidized bed 1; and 12, a distributing plate for uniform blowing of the fluidizing gas introduced through a bottom of the combustion furnace 5 into the fluidized bed 4.

In the gasification facility described above, during normal operation, the fluidized bed 1 is formed by steam in the gasification furnace 2. A raw material such as coal, biomass or tire chips charged into the fluidized bed 1 is gasified by way of steam gasification into the gasification gas and combustible solid. The combustible solid produced in the gasification furnace 2 is introduced along with the fluid medium through the introduction pipe 3 into the combustion furnace 5 having the fluidized bed 4 formed with the fluidizing gas, and is burned. A combustion exhaust gas from the combustion furnace 5 is introduced through the exhaust gas pipe 6 into the fluid-medium separator 8 such as the hot cyclone where the fluid medium is separated from the combustion exhaust gas. The separated fluid medium is returned through the downcomer 7 to the gasification furnace 2 and is circulated.

Thus, the fluid medium elevated in temperature by the combustion of the combustible solid in the combustion furnace 5 passes the exhaust gas pipe 6 along with the combustion exhaust gas, is separated by the separator 8 and is supplied through the downcomer 7 to the gasification furnace 2, so that the furnace 2 is kept high-temperatured. A gas produced by and the raw material residual in pyrolysis of the raw material are reacted with steam, so that a water gasification reaction $C+H_2O=H_2+CO$ and a hydrogen conversion reaction $CO+H_2O=H_2+CO_2$ occur, resulting in production of a combustible gasification gas or gases such as $H_2$ and CO.

From the gasification gas produced in the gasification furnace 2, the fluid medium is separated by the separator 9 and is recovered by the vessel 10.

When heat is insufficient during the normal operation in the gasification facility, i.e., when sufficient heat is unavailable for the gasification of the raw material in the gasification furnace 2, fuel such as coal, biomass or tire chips same as the raw material supplied to the furnace 2 is supplementarily charged into the combustion furnace 5 for combustion as indicated by imaginary line in FIG. 1 to compensate the insufficient heat. During a circulative preheating operation preparative to the normal operation in the gasification facility, the raw material is not charged into the gasification furnace 2, but the fuel such as coal, biomass or tire chips is supplied for preheating to the combustion furnace 5 and is burned as indicated by the imaginary line in FIG. 1; the fluid medium elevated in temperature by the combustion of the fuel in the combustion furnace 5 passes the exhaust gas pipe 6 along with the combustion exhaust gas, is separated by the separator 8 and is supplied through the downcomer 7 to the gasification furnace 2, whereby the circulative preheating of the gasification facility is performed.

A temperature of the gasification furnace 2 in the gasification facility described above is adapted to be controlled by a circulating amount of the fluid medium which is high-temperatured. If the circulating amount of the fluid medium is increased and decreased, the temperature of the gasification furnace 2 is raised and lowered, respectively. The circulating amount of the fluid medium is usually adapted to be controllable by, for example, adjusting a flow rate of the fluidizing gas introduced through the bottom of the combustion furnace 5.

Generally, a gasification rate or carbon conversion ratio of the raw material charged into the gasification furnace 2 is significantly affected by a temperature and a retention time of the fluid medium in the gasification furnace 2.

Therefore, for example, when on request from a receiver of the gasification gas it is desired to lower the carbon conversion ratio and thus decrease a produced amount of the gasification gas, one method may be to decrease the circulating amount of the fluid medium to lower the temperature of the gasification furnace 2; and when it is desired to increase a produced amount of the gasification gas by raising the carbon conversion ratio, one method may be to increase the circulating amount of the fluid medium to raise the temperature of the gasification furnace 2.

Though different from the gasification furnace as described above, a circulating fluidized-bed combusting device is disclosed, for example, in Patent Literature 1 in which a return position of a fluid medium to a circulating fluidized-bed combustion furnace is changed to maintain stability of a combustion state.

A biomass fuel gasification device is disclosed, for example, in Patent Literature 2 in which a circulating amount of a fluid medium is controlled to keep constant a temperature of a gasification furnace depending on a load.

CITATION LIST

Patent Literature

Patent Literature 1: JP 2002-98308A
Patent Literature 2: JP 63-120825A

SUMMARY OF INVENTION

Technical Problems

However, for example, when on request from a receiver of the gasification gas it is desired to lower a carbon conversion ratio and thus decrease a produced amount of a gasification gas, lowering in temperature of the gasification furnace 2 by decreasing a circulating amount of the fluid medium as described above may possibly fail to substantially change the carbon conversion ratio since the retention time of the fluid medium in the gasification furnace 2 increases due to the fact that a volume of the fluid medium in the gasification furnace 2 is constant unless the fluid medium is extracted outside of a system.

Thus, it turns out difficult in the current configuration to separately control a temperature and a retention time of the fluid medium in the gasification furnace 2.

The invention was conceived in view of the above and has its object to provide a method and a device for controlling retention time of a fluid medium in a fluidized-bed gasification furnace in a gasification facility, capable of controlling a retention time of the fluid medium in the gasification furnace separately from a temperature of the fluid medium in the gasification furnace to thereby change a gasification rate or carbon conversion ratio of a raw material charged into the gasification furnace on request.

Solution to Problems

The invention is directed to a method for controlling a retention time of a fluid medium in a fluidized-bed gasification furnace in a gasification facility comprising a gasification furnace having a fluidized bed of a fluid medium formed with steam to gasify a charged raw material for production of a gasification gas and a combustible solid, a combustion furnace into which the combustible solid produced by said gasification furnace is introduced along with the fluid medium to form a fluidized bed with a fluidizing gas to burn the combustible solid and a fluid-medium separator which separates a fluid medium from a combustion exhaust gas introduced from the combustion furnace to supply the separated fluid medium to the gasification furnace, characterized in that the fluid medium is guided to any one of a plurality of fluid-medium charge ports connected to said gasification furnace at intervals from an upstream end thereof toward a downstream side in a distribution direction of the fluid medium longitudinally of the gasification furnace, that a raw material is guided to one of raw-material charge ports connected to said gasification furnace at positions longitudinally thereof corresponding to said fluid-medium charge port and that the fluid medium is extracted and guided through a fluid-medium extraction port connected to said gasification furnace at a longitudinally downstream end thereof in the distribution direction of the fluid medium, thereby controlling the retention time of the fluid medium in the gasification furnace.

The invention is also directed to a device for controlling a retention time of a fluid medium in a fluidized-bed gasification furnace in a gasification facility comprising a gasification furnace having a fluidized bed of a fluid medium formed with steam to gasify a charged raw material for production of a gasification gas and a combustible solid, a combustion furnace into which the combustible solid produced by said gasification furnace is introduced along with the fluid medium to form a fluidized bed with a fluidizing gas to burn the combustible solid and a fluid-medium separator which separates a fluid medium from a combustion exhaust gas introduced from the combustion furnace to supply the separated fluid medium to the gasification furnace, characterized in that the device comprises a plurality of fluid-medium charge ports connected to said gasification furnace at intervals from an upstream end thereof toward a downstream side in a distribution direction of the fluid medium longitudinally of the gasification furnace;

fluid-medium charge switching means for guiding the fluid medium separated by the fluid-medium separator to any one of the fluid-medium charge ports;

a plurality of raw-material charge ports connected to the gasification furnace at intervals from an upstream end thereof toward a downstream side in the distribution direction of the fluid medium longitudinally of the gasification furnace correspondingly to the plural fluid-medium charge ports;

a raw-material charge switching means for guiding the raw material to any one of the plural raw-material charge ports; and a fluid-medium extraction port connected to said gasification furnace at a longitudinally downstream end thereof in distribution direction of the fluid medium for extracting and guiding the fluid medium from said gasification furnace to said combustion furnace.

According to a method and a device for controlling a retention time of a fluid medium in a fluidized-bed gasification furnace in a gasification facility of the invention, the following effects are acquired.

When on request from a receiver of the gasification gas it is desired, for example, to lower a carbon conversion ratio and thus decrease an amount of a produced gasification gas, the temperature of the gasification furnace is lowered by reducing a circulating amount of the fluid medium; in this case, though a volume of the fluid medium in the gasification furnace is constant unless the fluid medium is extracted outside of a system, one of the fluid-medium charge ports may be selected such that a charged position of the fluid medium is set closer to the extraction side, which shortens the distance to the fluid-medium extraction port and prevents the retention time of the fluid medium in the gasification furnace from increasing. Thus the carbon conversion ratio can be lowered. In this case, the raw material may be guided to one of raw-material charge ports corresponding to the fluid-medium charge port to which the fluid medium is guided, and may be charged from the raw-material charge port to the gasification furnace.

In a device for controlling a retention time of a fluid medium in a fluidized-bed gasification furnace in a gasification facility, said fluid-medium charge switching means may comprise a downcomer through which the fluid medium separated from a combustion exhaust gas by the fluid-medium separator flows down;

horizontal seals extending horizontally and branched from a lower end of said downcomer toward the fluid-medium charge ports;

vertical seals extending upward from leading ends of said horizontal seals;

inclined connecting pipes turned downward from upper ends of said vertical seals and connected to said fluid-medium charge ports;

wind boxes capable of delivering a fluidizing gas through distributing plates to said horizontal and vertical seals;

fluidizing-gas supply lines connected to the wind boxes; and fluidizing-gas switching valves incorporated in said fluidizing-gas supply lines.

In a device for controlling a retention time of a fluid medium in a fluidized-bed gasification furnace in a gasification facility, said raw-material charge switching means may comprise raw-material supply lines connected to said raw-material charge ports; and raw-material switching valves incorporated in said raw-material supply lines.

Advantageous Effects of Invention

A method and a device for controlling a retention time of a fluid medium in a fluidized-bed gasification furnace in a gasification facility of the invention achieve excellent effects that a retention time of a fluid medium in a gasification furnace can be adjusted separately from a temperature of the fluid medium in the gasification furnace and that a gasification rate or carbon conversion ratio of a raw material charged into the gasification furnace can be changed on request.

DESCRIPTION OF EMBODIMENT

An embodiment of the invention will be described with reference to the accompanying drawings.

Figure 1:
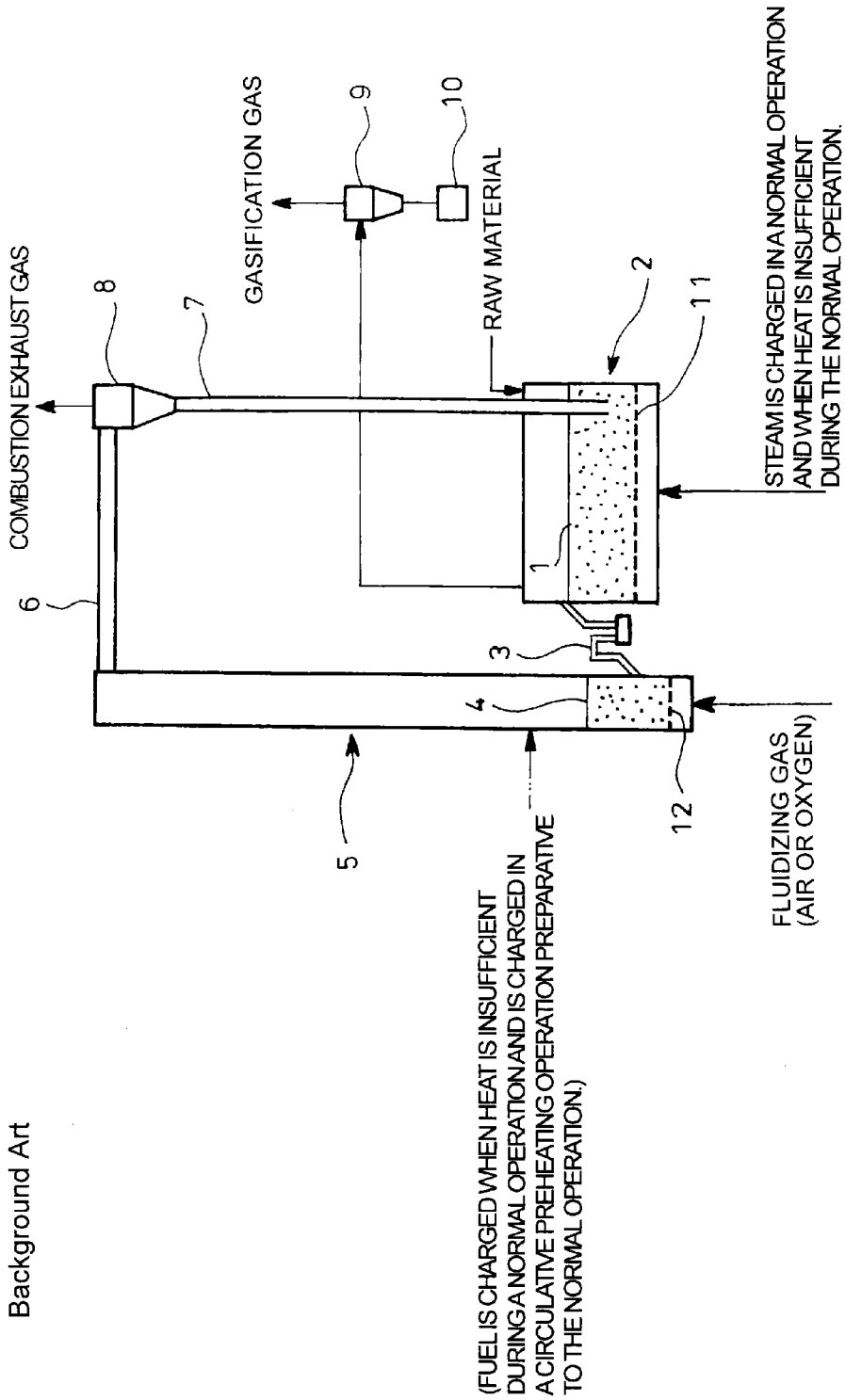
FIG. 1 is a schematic of an overall configuration showing an example of a gasification facility under development having a gasification furnace and a combustion furnace.
Figure 2:
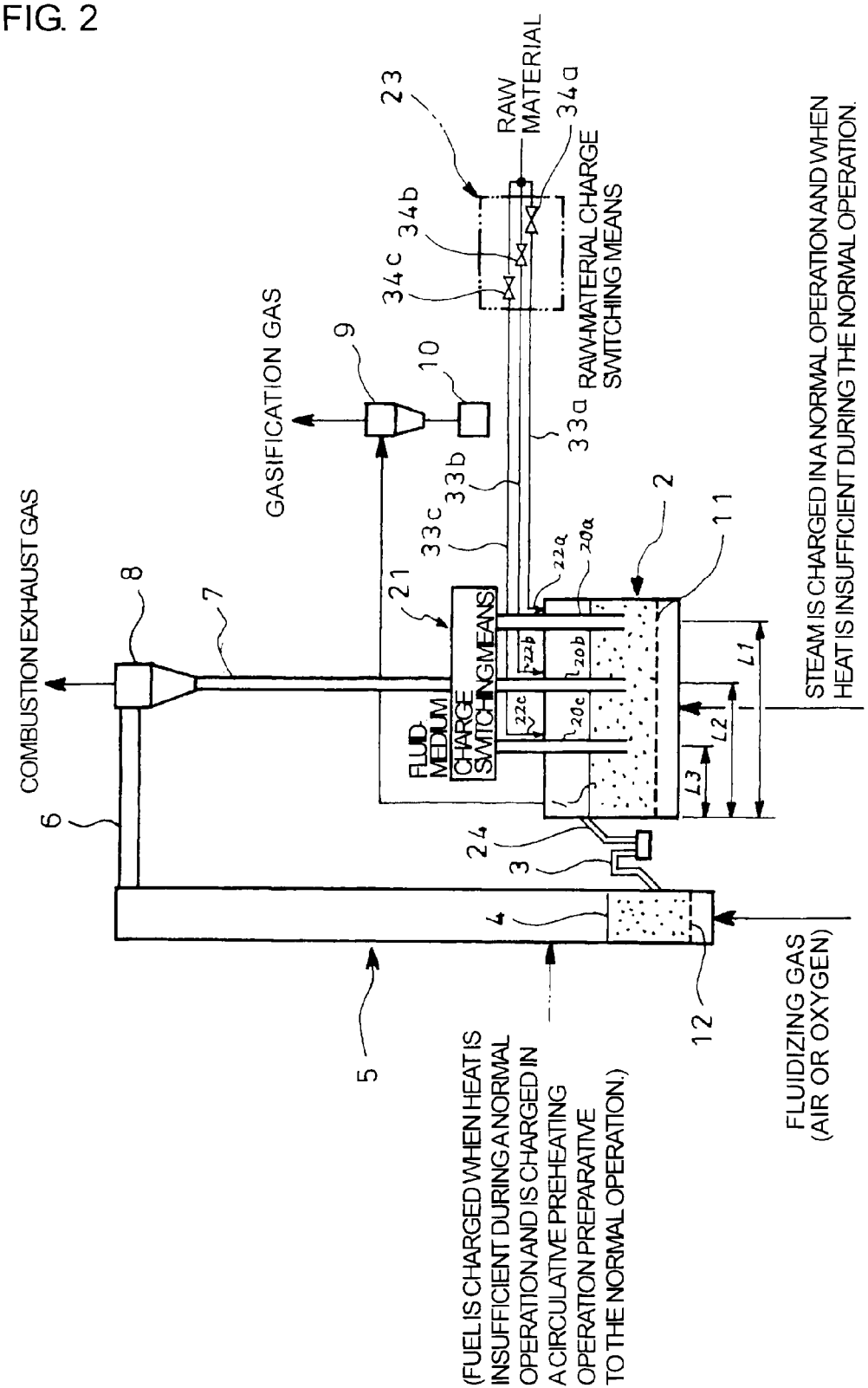
FIG. 2 is a schematic of an overall configuration showing an embodiment of the invention.
Figure 3:
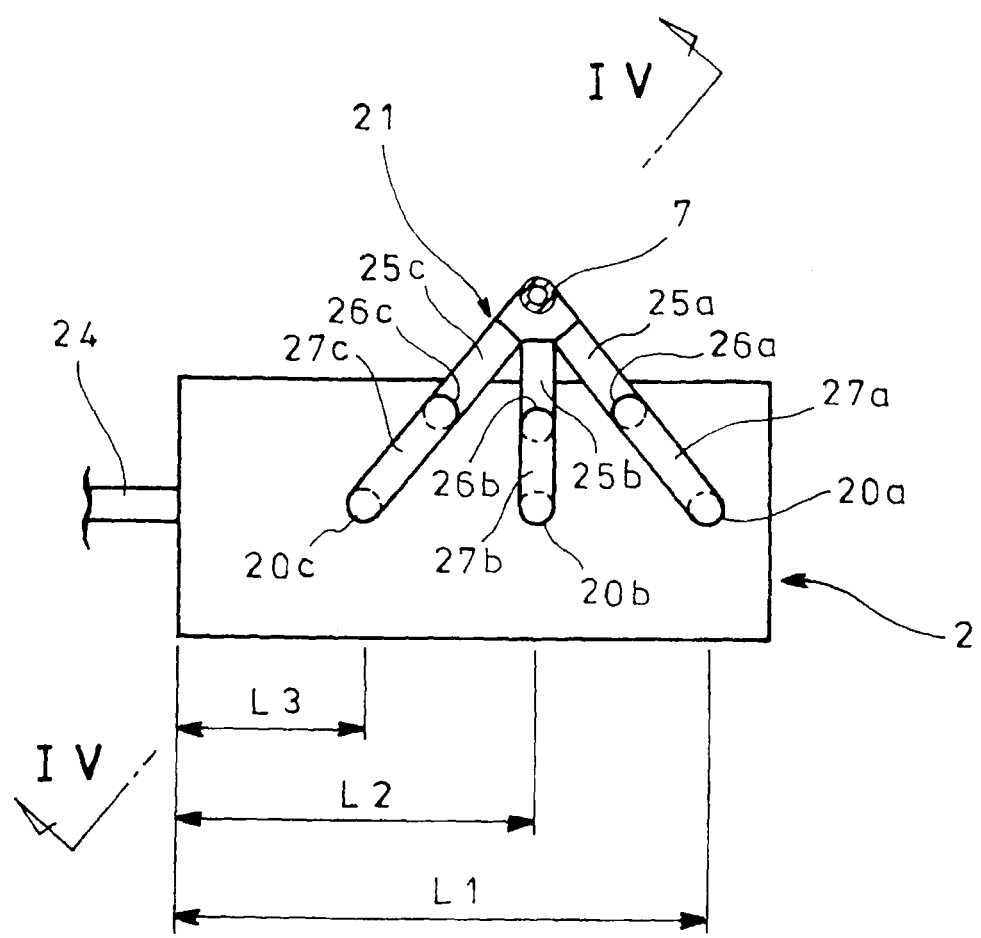
FIG. 3 is an enlarged plan view of substantial parts in the embodiment of the invention.
Figure 4:
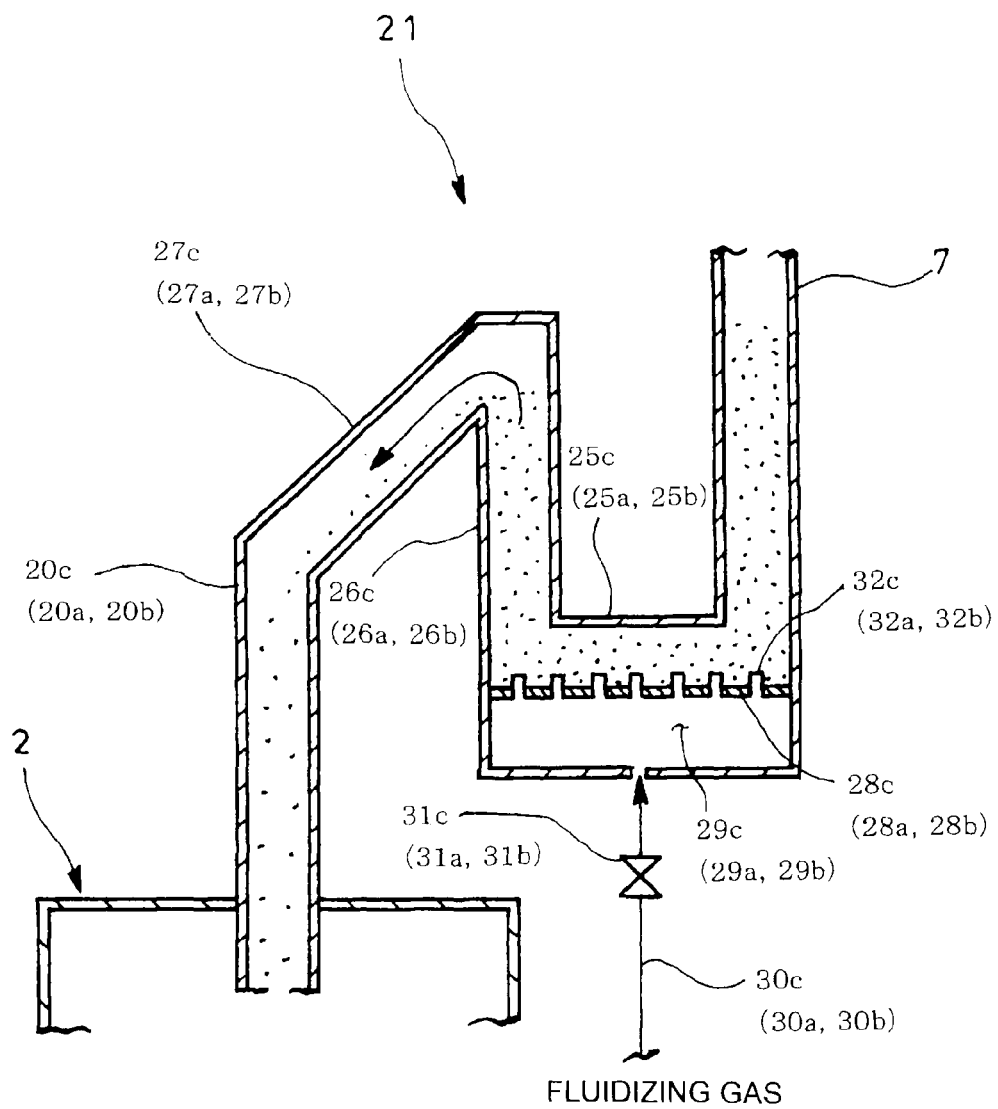
FIG. 4 is a sectional side view of a fluid-medium charge switching means in the embodiment of the invention, corresponding to a view looking in the direction of arrows IV in FIG. 3.

FIGS. 2-4 show the embodiment of the invention in which parts similar to those in FIG. 1 are represented by the same reference numerals. Although a basic configuration is the same as the conventional configuration shown in FIG. 1, the embodiment is characteristic as shown in FIGS. 2-4 in that a plurality of fluid-medium charge ports 20a, 20b and 20c are connected to a gasification furnace 2 at intervals from an upstream end thereof toward a downstream side in a distribution direction of a fluid medium longitudinally of the furnace 2. A fluid-medium charge switching means 21 is disposed to guide the fluid medium separated by a fluid-medium separator 8 from a downcomer 7 to any one of the ports 20a, 20b and 20c. A plurality of raw-material charge ports 22a, 22b and 22c are connected to the gasification furnace 2 at intervals from the upstream end thereof toward the downstream side in the distribution direction of the fluid medium longitudinally of the furnace 2 correspondingly to the plural fluid-medium charge ports 20a, 20b and 20c. A raw-material charge switching means 23 is disposed to guide a raw material to any one of the raw-material charge ports 22a, 22b and 22c. A fluid-medium extraction port 24 extracting and guiding the fluid medium from the gasification furnace 2 to an introduction pipe 3 of the combustion furnace 5 is disposed on the furnace 2 at a downstream end thereof in the distribution direction of the fluid medium longitudinally of the furnace 2.

In the embodiment, as shown in FIGS. 3 and 4, the fluid-medium charge switching means 21 is configured such that horizontal seals 25a, 25b and 25c extend horizontally and are branched from a lower end of the downcomer 7, through which the fluid medium separated from a combustion exhaust gas by the separator 8 have flowed down, toward the fluid-medium charge ports 20a, 20b and 20c, respectively. From leading ends of the seals 25a, 25b and 25c, vertical seals 26a, 26b and 26c extend upward, respectively. From upper ends of the seals 26a, 26b and 26c, inclined connecting pipes 27a, 27b and 27c are turned downward and are connected to the fluid-medium charge ports 20a, 20b and 20c, respectively. Wind boxes 29a, 29b and 29c capable of delivering a fluidizing gas through distributing plates 28a, 28b and 28c to the seals 25a, 25b and 25c and 26a, 26b and 26c are provided and connected to fluidizing-gas supply lines 30a, 30b and 30c in which fluidizing-gas switching valves 31a, 31b and 31c are incorporated, respectively. Opening degrees of the valves 31a, 31b and 31c can be controlled to supply the fluidizing gas to any desired one of the wind boxes 29a, 29b and 29c to fluidize the fluid medium in the corresponding seals 25a, 25b or 25c and 26a, 26b or 26c, so that the fluid medium separated by the separator 8 can be guided from the downcomer 7 to any one of the fluid-medium charge ports 20a, 20b and 20c. The distributing plates 28a, 28b and 28c are provided with a number of protruding injection nozzles 32a, 32b and 32c capable of injecting the fluidizing gas, respectively.

As shown in FIG. 2, the raw-material charge switching means 23 is constructed such that raw-material supply lines 33a, 33b and 33c having raw-material switching valves 34a, 34b and 34c incorporated therein are connected to the raw-material charge ports 22a, 22b and 22c, respectively, so that opening degrees of the switching valves 34a, 34b and 34c can be controlled to guide a raw material to any one of the ports 22a, 22b and 22c corresponding to the port 20a, 20b or 20c to which the fluid medium is guided.

An operation of the embodiment will be described.

During normal operation where there is no necessity to change a gasification rate or carbon conversion ratio of the raw material charged into the gasification furnace 2, the fluidizing gas is delivered to the wind box 29a by opening only the valve 31a of the fluid-medium charge switching means 21 and closing the valves 31b and 31c to fluidize the fluid medium in the corresponding horizontal and vertical seals 25a and 26a, so that the fluid medium separated by the separator 8 is guided from the downcomer 7 to the port 20a and is charged from the port 20a to the gasification furnace 2, a distance between the fluid-medium charge and extraction ports 20a and 24 being L1. In this case, by opening only the valve 34a of the raw-material charge switching means 23 and closing the valves 34b and 34c, the raw material may be guided to the port 22a corresponding to the port 20a to which the fluid medium is guided, and may be charged from the port 22a to the gasification furnace 2.

On the other hand, when on request from a receiver of the gasification gas it is desired, for example, to lower a carbon conversion ratio and thus decrease a produced amount of the gasification gas, the temperature of the gasification furnace 2 is lowered by reducing a circulating amount of the fluid medium; in this case, although a volume of the fluid medium in the gasification furnace 2 is constant unless the fluid medium is extracted outside of the system, a charged position of the fluid medium is set closer to the extraction side. More specifically, only the valve 31c is opened and the valves 31a and 31b are closed to deliver the fluidizing gas to fluidize the fluid medium in the corresponding horizontal and vertical seals 25c and 26c so that the fluid medium separated by the separator 8 is guided from the downcomer 7 to the port 20c and is charged from the port 20c to the gasification furnace 2, the distance to the fluid-medium extraction port 24 being shortened from L1 to L3. As a result, the retention time of the fluid medium in the gasification furnace 2 is prevented from increasing and the carbon conversion ratio can be lowered. In this case, by opening only the valve 34c and closing the valves 34a and 34b, the raw material may be guided to the port 22c corresponding to the port 20c to which the fluid medium is guided, and may be charged from the port 22c to the gasification furnace 2.

If the fluidizing gas is delivered to the wind box 29b as need demands by opening only the valve 31b and closing the valves 31a and 31c to fluidize the fluid medium in the corresponding horizontal and vertical seals 25b and 26b, the fluid medium separated by the separator 8 is guided from the downcomer 7 to the port 20b and is charge from the port 20b to the gasification furnace 2, the distance to the fluid-medium extraction port 24 being changed to L2. In this case, by opening only the raw-material switching valve 34b and closing the raw-material switching valves 34a and 34c, the raw material may be guided to the port 22b corresponding to the port 20b to which the fluid medium is guided, and may be charged from the port 22b to the gasification furnace 2.

When the circulating amount of the fluid medium is kept constant without change and the fluid medium separated by the separator 8 is guided from the downcomer 7 to any one of the ports 20a, 20b and 20c and the raw material is guided correspondingly to any one of the ports 22a, 22b and 22c, then the retention time may be changed with the temperature being kept constant.

Thus, the configuration of the embodiment enables the fluid medium to be stably distributed to any desired one of the ports 20a, 20b and 20c without providing a movable mechanism or the like on the means for charging the high-temperatured fluid medium to the gasification furnace 2 and enables the temperature and the retention time of the fluid medium in the gasification furnace 2 to be changed separately from each other.

As a result, the retention time of the fluid medium in the gasification furnace 2 may be adjusted separately from a temperature of the fluid medium in the gasification furnace 2 and a gasification rate or carbon conversion ratio of a raw material charged into the gasification furnace 2 may be changed on request.

Though FIG. 1 of Patent Literature 1 shows a circulating fluidized-bed combustion device with a return position of a fluid medium to a circulating fluidized-bed combustion furnace being changed to keep a combustion state stable, this is intended only for the combustion furnace completely different from a gasification furnace for which a retention time of the fluid medium is to be controlled; the fluid medium may be distributed by changing amounts of air to three loop seals or branches from a downcomer itself, which is deemed to make distribution of the fluid medium hardly stable.

Patent Literature 2 merely discloses a gasification furnace with its temperature being kept constant depending on a load by controlling a circulating amount of a fluid medium, which is completely different from the claimed gasification furnace 2 with a charged position of the fluid medium being changed.

It is to be understood that a method and a device for controlling a retention time of a fluid medium in a fluidized-bed gasification furnace in a gasification facility of the invention are not limited to the above embodiment and that various changes and modifications may be made without departing from the scope of the invention. For example, each of the numbers of the fluid-medium charge ports and the raw-material charge ports is not limited to three and may be two, four or more; the fluid-medium charge ports may be connected to not a top but a side surface of the gasification furnace.

REFERENCE SIGNS LIST 1 fluidized bed
2 gasification furnace
3 introduction pipe
4 fluidized bed
5 combustion furnace
7 downcomer
8 fluid-medium separator
20a fluid-medium charge port
20b fluid-medium charge port
20c fluid-medium charge port
21 fluid-medium charge switching means
22a raw-material charge port
22b raw-material charge port
22c raw-material charge port
23 raw-material charge switching means
24 fluid-medium extraction port
25a horizontal seal
25b horizontal seal
25c horizontal seal
26a vertical seal
26b vertical seal
26c vertical seal
27a inclined connecting pipe
27b inclined connecting pipe
27c inclined connecting pipe
28a dispersing plate
28b dispersing plate
28c dispersing plate
29a wind box
29b wind box
29c wind box
30a fluidizing-gas supply line
30b fluidizing-gas supply line
30c fluidizing-gas supply line
31a fluidizing-gas switching valve
31b fluidizing-gas switching valve
31c fluidizing-gas switching valve
33a raw-material supply line
33b raw-material supply line
33c raw-material supply line
34a raw-material switching valve
34b raw-material switching valve
34c raw-material switching valve

The invention claimed is:

1. A device for controlling a retention time of a fluid medium in a fluidized-bed gasification furnace in a gasification facility including a gasification furnace having a fluidized bed of a fluid medium formed with steam to gasify a charged raw material for production of a gasification gas and a combustible solid, a combustion furnace into which the combustible solid produced by said gasification furnace is introduced along with the fluid medium to form a fluidized bed with a fluidizing gas to burn the combustible solid and a fluid-medium separator which separates a fluid medium from a combustion exhaust gas introduced from the combustion furnace to supply the separated fluid medium to the gasification furnace the device comprising:

a plurality of fluid-medium charge ports connected to said gasification furnace at intervals from an upstream end thereof toward a downstream side in a distribution direction of the fluid medium longitudinally of the gasification furnace;

fluid-medium charge switching means for guiding the fluid medium separated by the fluid-medium separator to any one of the fluid-medium charge ports;

a plurality of raw-material charge ports connected to the gasification furnace at intervals from an upstream end thereof toward a downstream side in the distribution direction of the fluid medium longitudinally of the gasification furnace correspondingly to the plural fluid-medium charge ports;

a raw-material charge switching means for guiding the raw material to any one of the plural raw-material charge ports; and a fluid-medium extraction port connected to said gasification furnace at a longitudinally downstream end thereof in distribution direction of the fluid medium for extracting and guiding the fluid medium from said gasification furnace to said combustion furnace.

2. A device for controlling a retention time of a fluid medium in a fluidized-bed gasification furnace in a gasification facility as claimed in claim 1, wherein said fluid-medium charge switching means comprises a downcomer through which the fluid medium separated from a combustion exhaust gas by the fluid-medium separator flows down;

horizontal seals extending horizontally and branched from a lower end of said downcomer toward the fluid-medium charge ports;

vertical seals extending upward from leading ends of said horizontal seals;

inclined connecting pipes turned downward from upper ends of said vertical seals and connected to said fluid-medium charge ports;

wind boxes capable of delivering a fluidizing gas through distributing plates to said horizontal and vertical seals;

fluidizing-gas supply lines connected to the wind boxes; and fluidizing-gas switching valves incorporated in said fluidizing-gas supply lines.

3. A device for controlling a retention time of a fluid medium in a fluidized-bed gasification furnace in a gasification facility as claimed in claim 1, wherein said raw-material charge switching means comprises raw-material supply lines connected to said raw-material charge ports; and raw-material switching valves incorporated in said raw-material supply lines.

4. A device for controlling a retention time of a fluid medium in a fluidized-bed gasification furnace in a gasification facility as claimed in claim 2, wherein said raw-material charge switching means comprises raw-material supply lines connected to said raw-material charge ports; and raw-material switching valves incorporated in said raw-material supply lines.

5. A method for controlling a retention time of a fluid medium in a fluidized-bed gasification furnace in a gasification facility including a gasification furnace having a fluidized bed of a fluid medium formed with steam to gasify a charged raw material for production of a gasification gas and a combustible solid, a combustion furnace into which the combustible solid produced by said gasification furnace is introduced along with the fluid medium to form a fluidized bed with a fluidizing gas to burn the combustible solid and a fluid-medium separator which separates a fluid medium from a combustion exhaust gas introduced from the combustion furnace to supply the separated fluid medium to the gasification furnace, the method comprising:

guiding the fluid medium to any one of a plurality of fluid-medium charge ports connected to said gasification furnace at intervals from an upstream end thereof toward a downstream side in a distribution direction of the fluid medium longitudinally of the gasification furnace;

guiding a raw material to one of raw-material charge ports connected to said gasification furnace at positions longitudinally thereof corresponding to said fluid-medium charge port; and extracting and guiding the fluid medium through a fluid-medium extraction port connected to said gasification furnace at a longitudinally downstream end thereof in the distribution direction of the fluid medium, thereby controlling the retention time of the fluid medium in the gasification furnace.

* * * * *